Feb. 28, 1967     D. S. WYSE ETAL     3,307,143
SONAR DEVICE
Filed Dec. 28, 1964     9 Sheets-Sheet 6
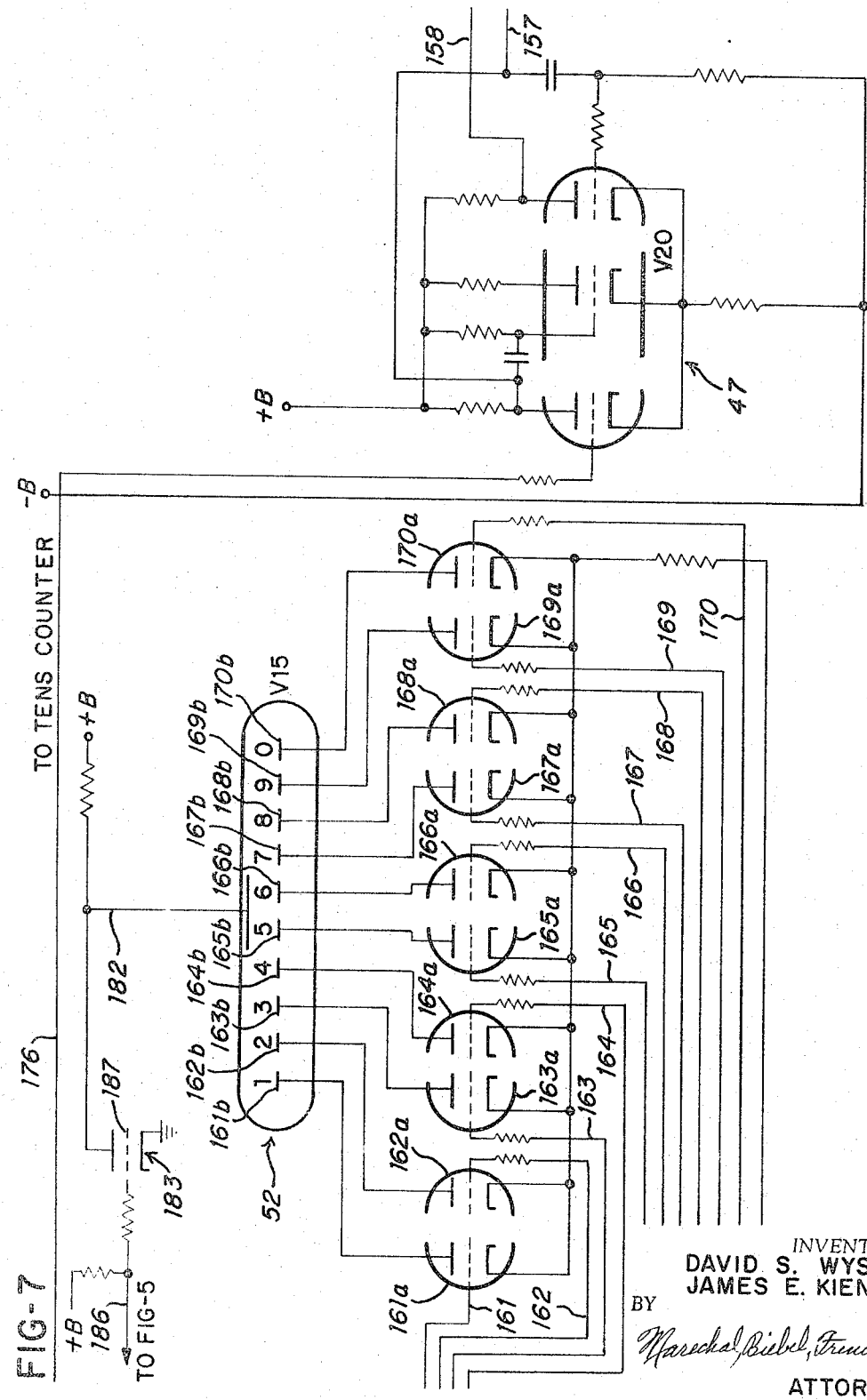
INVENTORS
DAVID S. WYSE &
JAMES E. KIENKER
BY
Marechal, Biebel, French & Bugg
ATTORNEYS

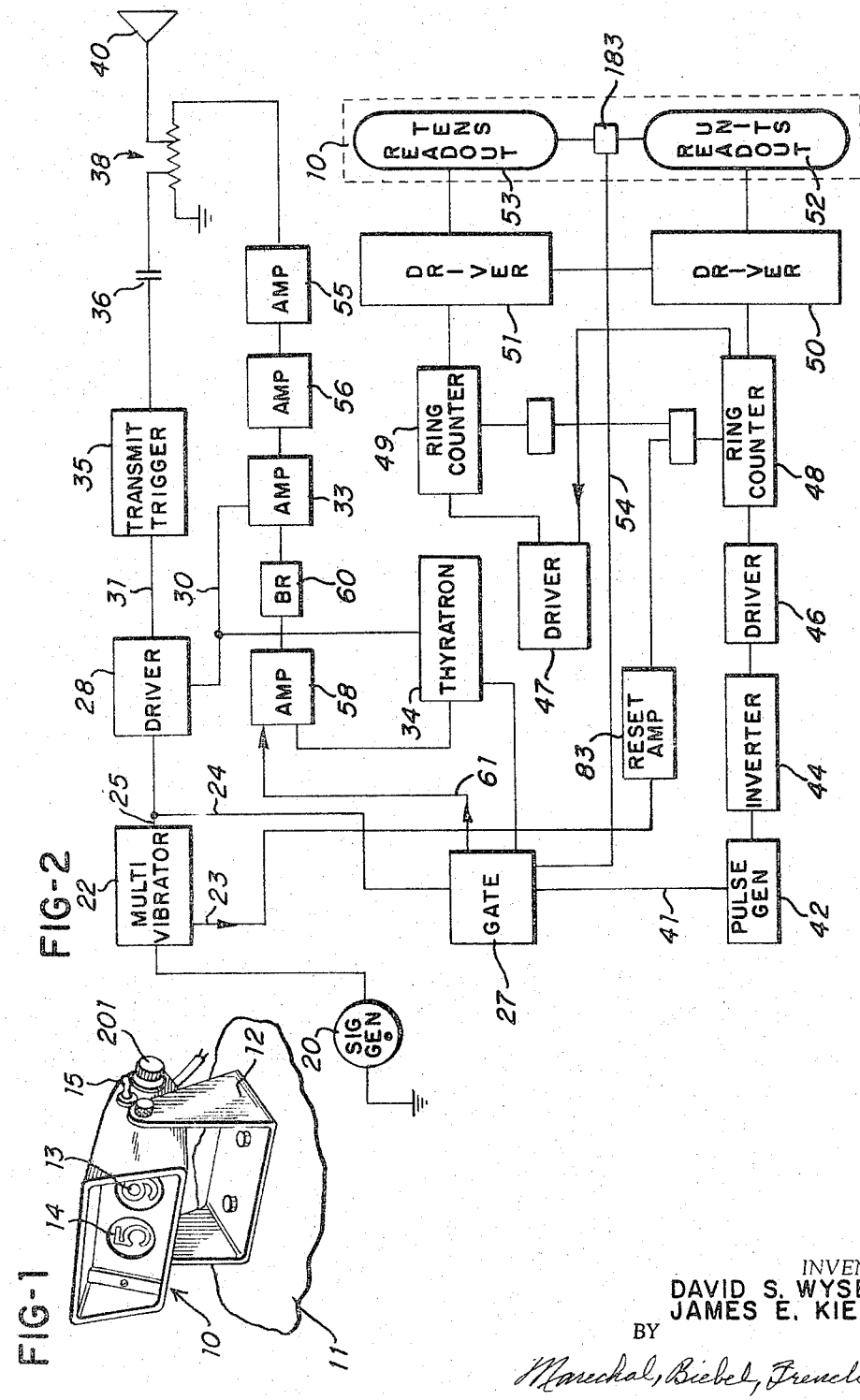

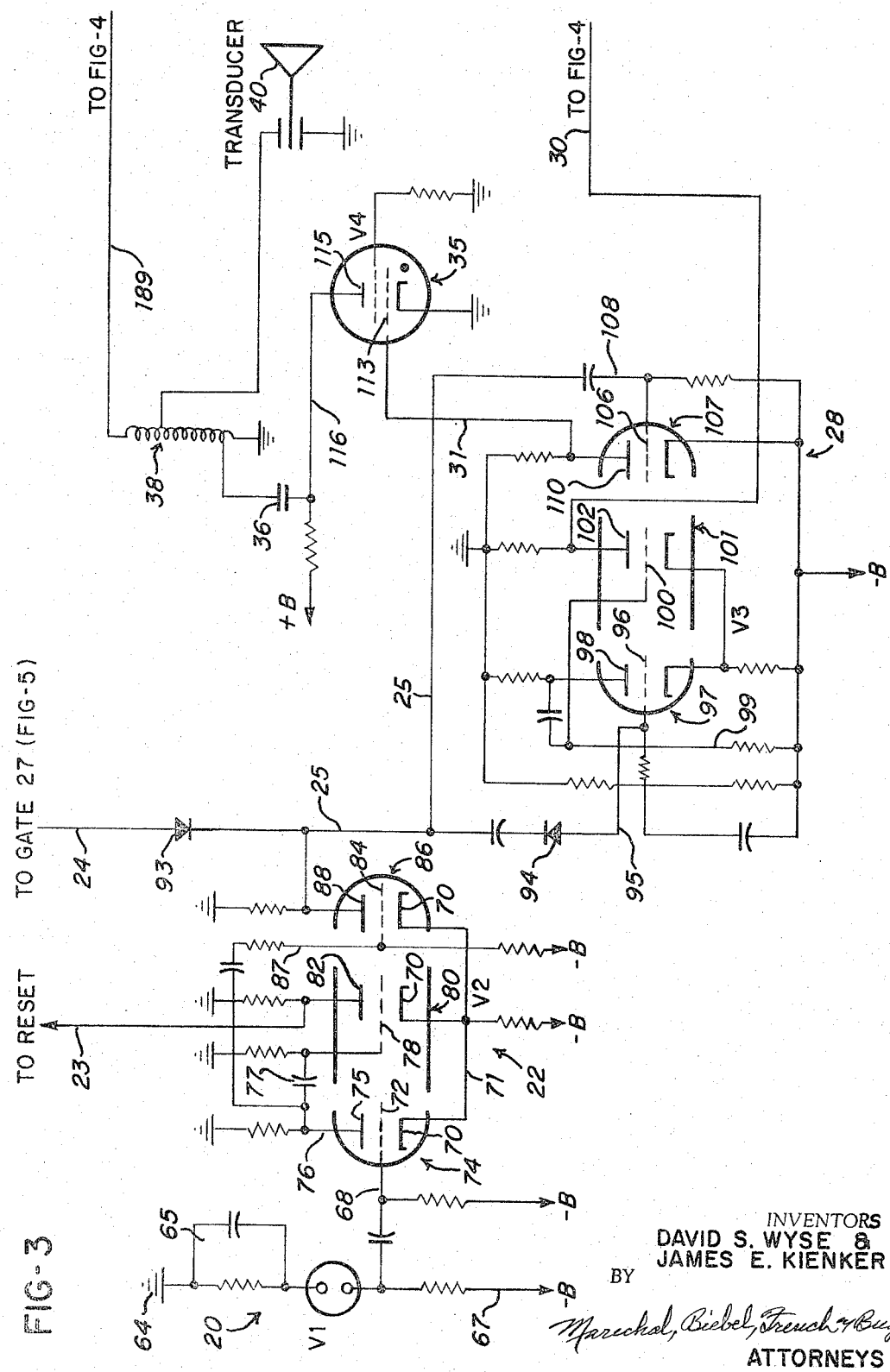

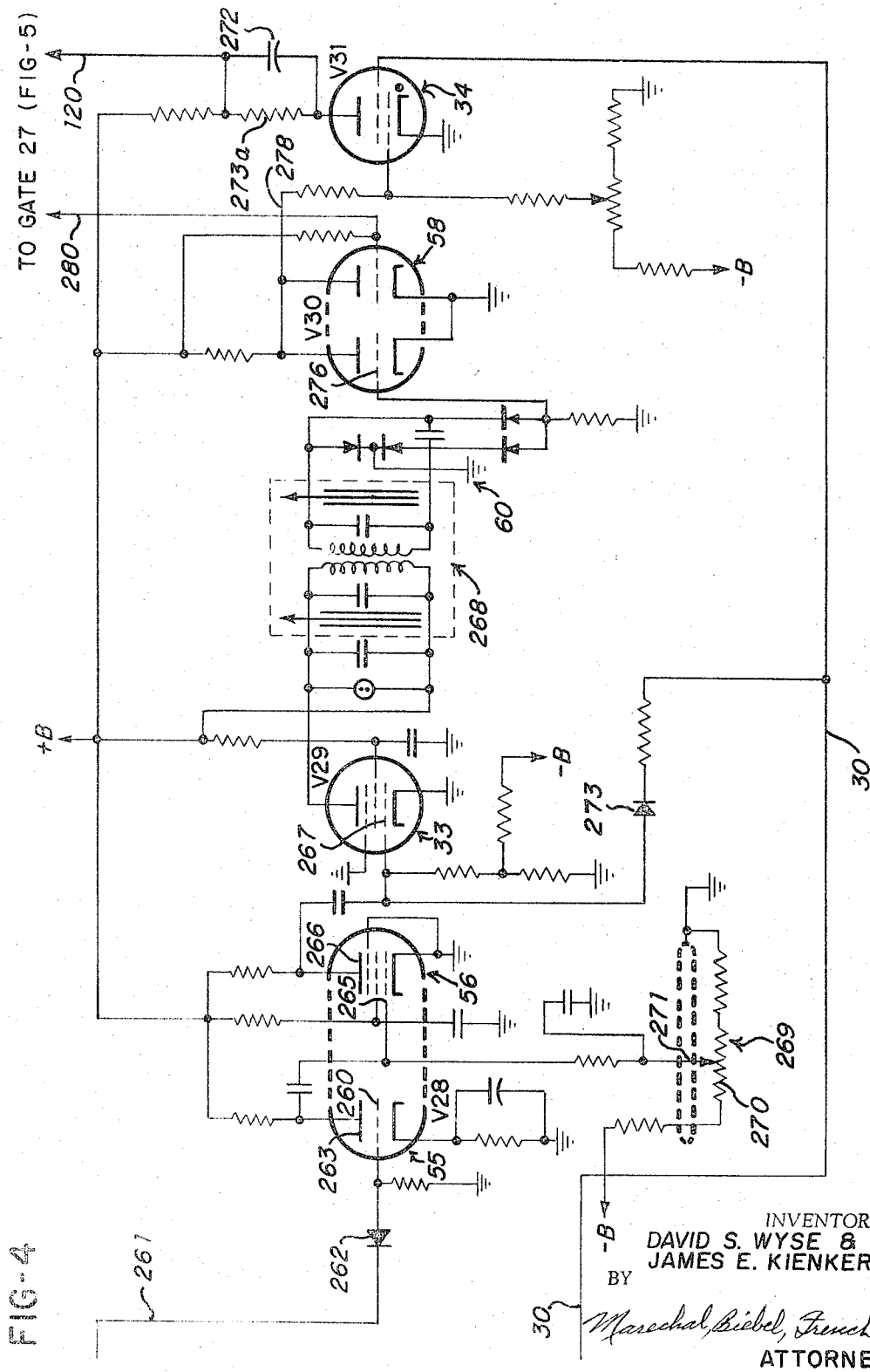

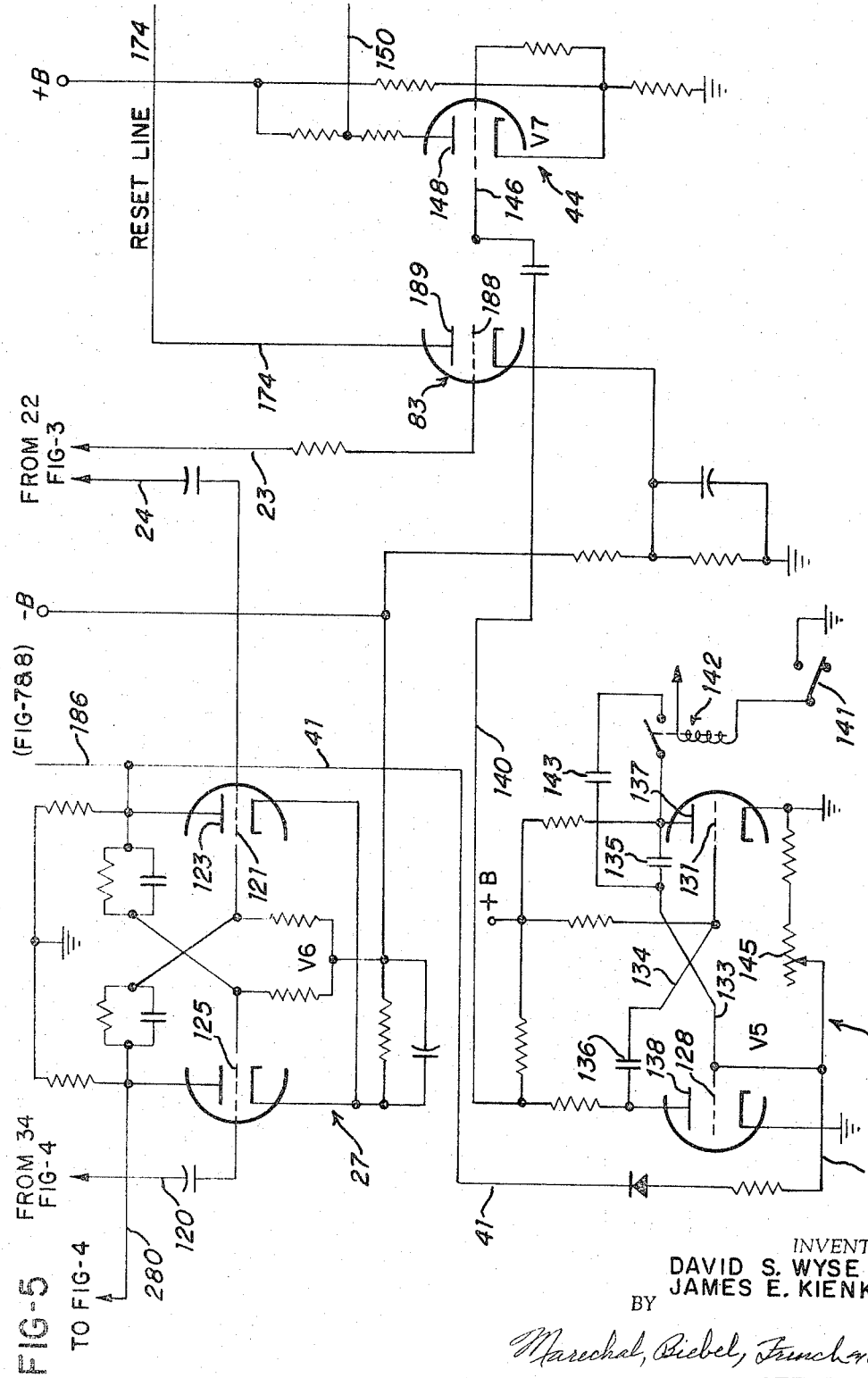

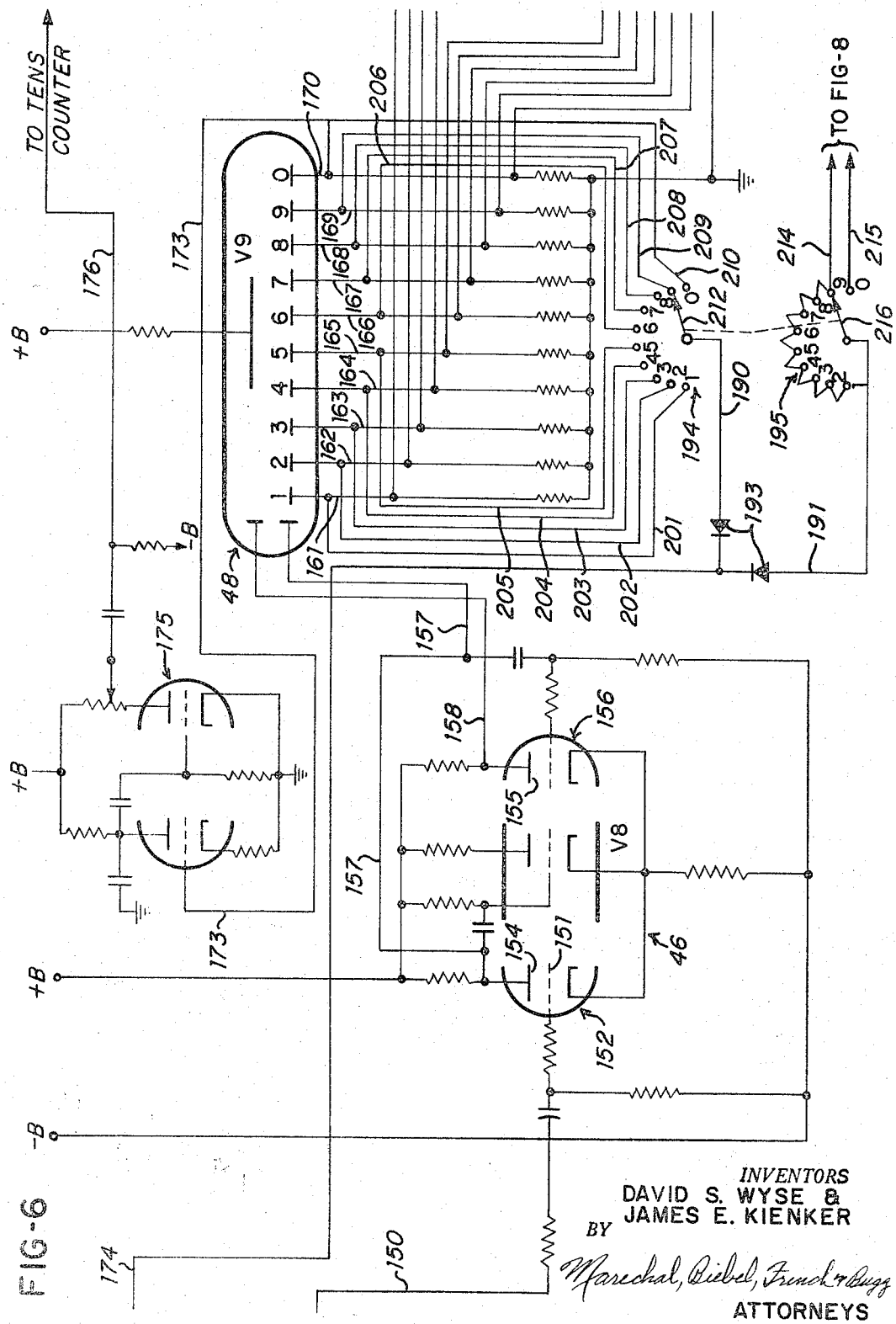

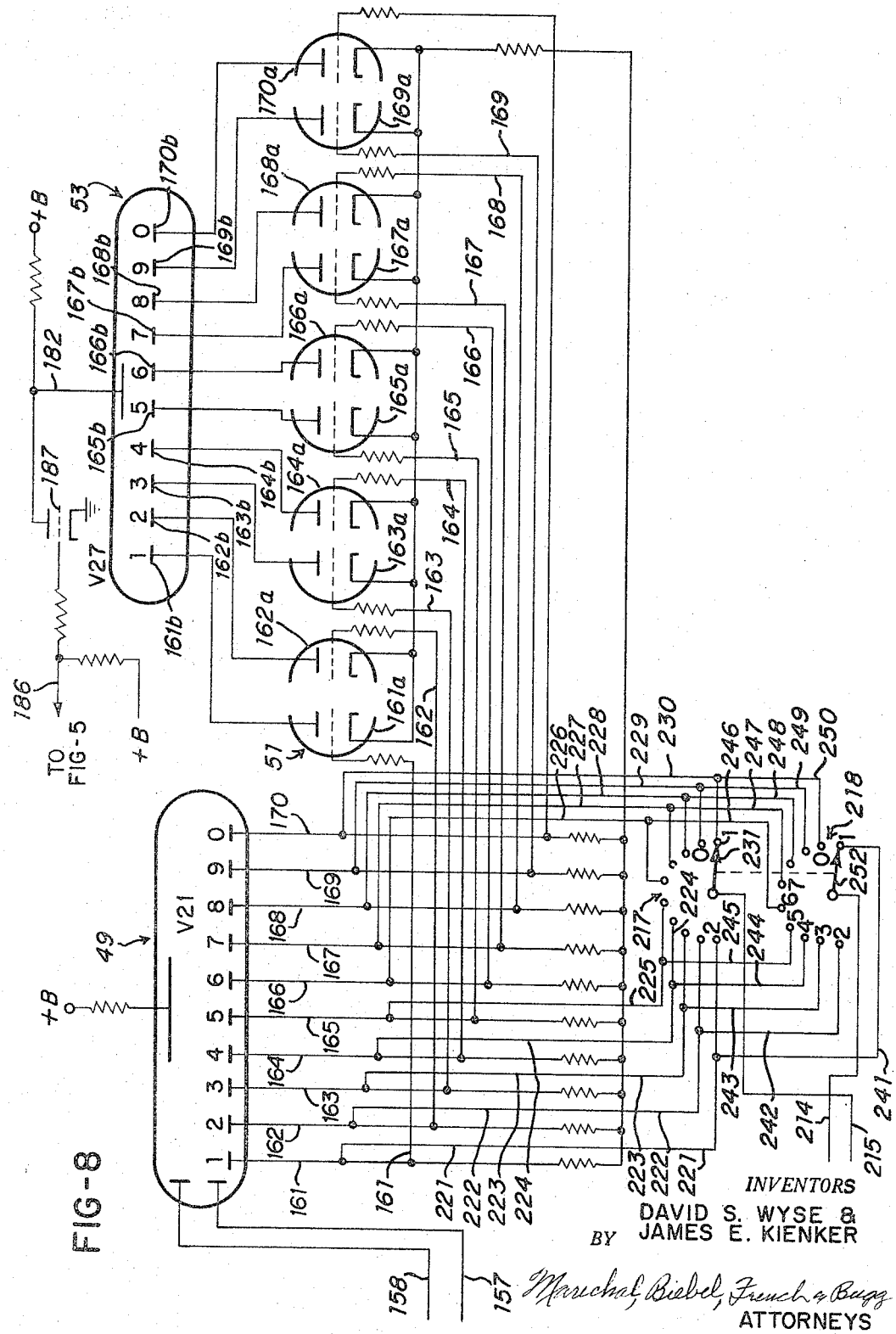

Feb. 28, 1967  D. S. WYSE ETAL  3,307,143
SONAR DEVICE
Filed Dec. 28, 1964  9 Sheets-Sheet 8

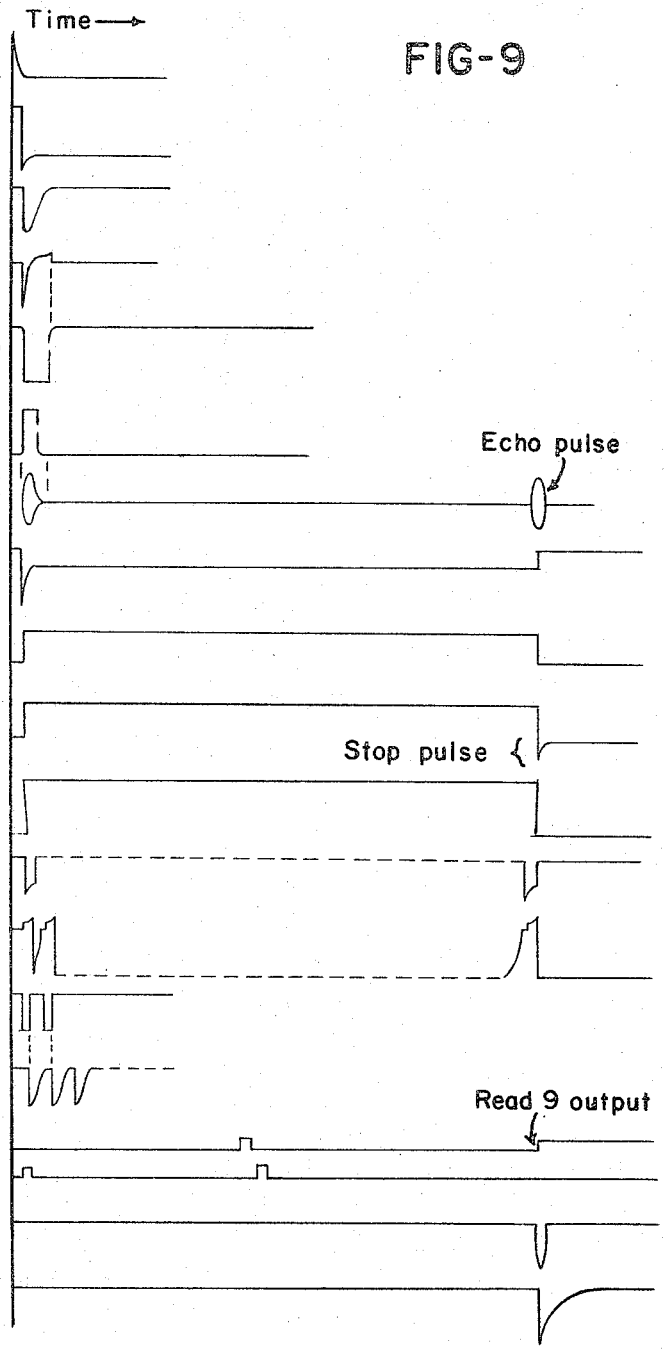

FIG-9

1 PULSE GEN 20
2 RESET PULSE 23
3 START PULSE 24
4 INPUT TO 28
5 BLANKING PULSE 30
6 TRIGGER PULSE 31
7 TRANSMITTED PULSE 35 & RETURN ECHO
8 START INPUT 27
9 GATE OUTPUT 124
10 STOP INPUT 27
11 CLOCK INPUT 42
12 CLOCK OUTPUT 44
13 COUNTER DRIVER INPUT 46
14 RING COUNTER INPUT LINE 157
15 RING COUNTER INPUT LINE 158
16 DIGIT 9
17 DIGIT 0
18 RECEIVER 58
19 STOP PULSE 34

INVENTORS
DAVID S. WYSE &
JAMES E. KIENKER
BY
Marechal, Biebel, French & Bugg
ATTORNEYS

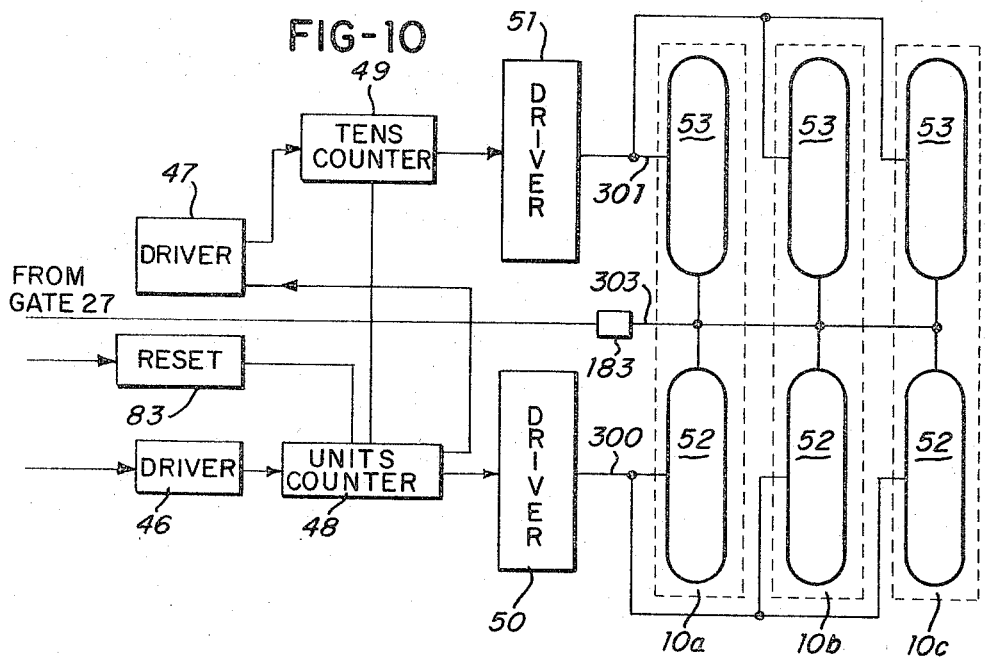
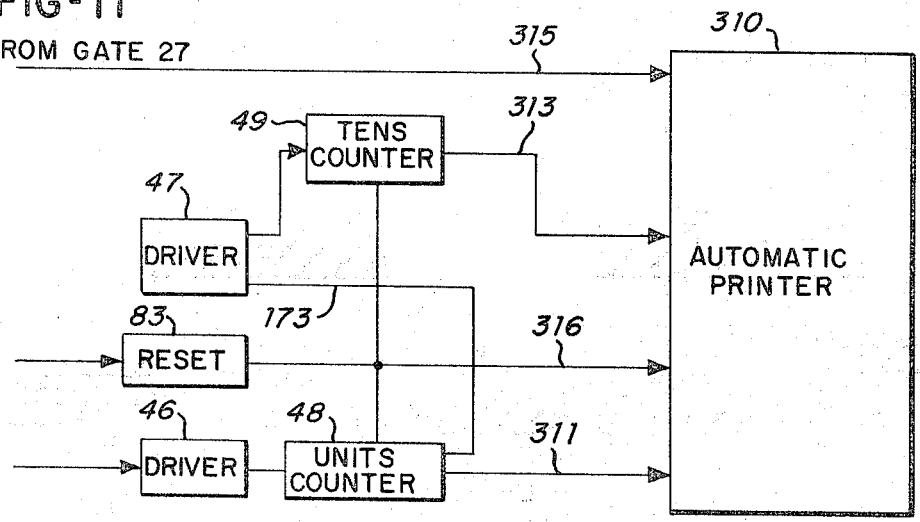

3,307,143
SONAR DEVICE
David S. Wyse and James E. Kienker, Dayton, Ohio, assignors to Projects Unlimited, Inc., Dayton, Ohio, a corporation of Ohio
Filed Dec. 28, 1964, Ser. No. 421,531
9 Claims. (Cl. 340—3)

This invention relates to a sonar device for measuring distances in liquids, and particularly to a simplified sonar device having a digital display.

One type of sonar device is the meter readout type which is often found in depth sounders sold for small pleasure craft and the like. The system uses a pointer which moves with respect to a graduated dial, and its main advantages lies in the fact that it can be easily adapted to different ranges by changing a switch. However, it is somewhat inferior due to its relatively high inaccuracies which result from the parallax, meter scale inaccuracies, and the tolerances in the associated electronic circuitry. The parallax inaccuracies arise during the reading of the meter due to the apparent displacement of the instrument pointer when viewed from different angles.

In addition, most of these meter type sonars are more accurate in the center portion of the scale than at either of the two extreme ends so that the meter should be kept in the intermediate ranges of the scale to obtain greater accuracy. Even then the full scale accuracy of most meters is only approximately 3% thus decreasing their usefulness in shallow water, and this accuracy is further impaired by the possible component value variations in the circuitry from which the reading is obtained. Since these systems generally depend upon the storage of a charge in a capacitor, a variation in capacitance will cause a variation in charge, and consequently an erroneous meter reading. Thus if wider range and closer tolerances are required the meter type sonar is not satisfactory.

Another type of sonar system uses the "flying-neon" type presentation whose prime advantage lies in its comparative low cost. Indication is given by a neon bulb rotating at a constant speed on an arm which is attached to a motor. The bulb flashes approximately twenty times each second, depending on the depth range required, and since in front of a circular graduated bezel, and since the neon bulb is rotating at a high speed, the indication appears as a smear and hence is not well defined. This system thus suffers from the disadvantages which include lack of definition, the inability to be read at a distance, and the inability to be switched from one range to another.

Other sonar devices use an oscilloscope readout wherein a signal is presented on the display surface of a cathode ray tube. A blip appears at zero degrees due to the transmitted signal and a trace follows along the outside perimeter of the round tube and blossoms into a blip when the echo is received. The displacement indication is then read on a graduated scale around the outside of the tube, and thus the blip is fairly wide and not well defined. This system thus requires interpolation which makes the type of presentation inherently inaccurate and difficult to read. Moreover, the cathode ray tube must be installed in a close proximity to the sonar transmitter and receiver device.

It is therefore an important object of this invention to provide an improved and relatively simplified sonar system whose output is highly accurate and can be read quickly in digital form without the usual requirement of interpolation.

Another object of this invention is to provide a sonar device whose display head is small and can be mounted in a vessel at a point remote from the other electronic gear of the system, and further to provide a sonar device whose display can be presented at several different locations within the vessel and in the form of a decimal numerical display which can be easily and quickly read at a glance.

A further object of this invention is to provide a sonar device having a digital readout display which can be shifted from one range to another, e.g., from feet to fathoms, and further to provide a readout head whose output can easily be read at a distance in a bright environment.

Another object of this invention is to provide a sonar system which is adapted to a high power or a low power sonar transmitter, and particularly to provide such a system which is light in weight and easily installed and thus is particularly adapted for use in pleasure yachts and the like.

A further object of the invention is to provide a sonar system which has a printer type readout wherein a continual record of depth is automatically made, and further to provide a sonar system of the aforesaid type wherein both visual and printed readouts are possible.

Other objects and advantages of this invention will be apparent from the following description, the accompanying drawings and the appended claims.

In the drawings—

FIG. 1 is a perspective view of the digital readout of the sonar system of the invention;

FIG. 2 is a block schematic of the electrical system of the invention;

FIGS. 3 to 8 are electrical schematic illustrations of a complete sonar system which can be read together by placing the sheets of drawings adjacent one another from left to right;

FIG. 9 is a time diagram of the pulses which are produced at various points within the sonar system;

FIG. 10 is a schematic block diagram showing another embodiment of the invention having a plurality of display heads; and FIG. 11 is a block schematic showing an embodiment of the invention using a printer type readout.

Referring to the drawings wherein a preferred embodiment of the invention is shown, FIG. 1 illustrates the digital display head 10 which is adapted to be mounted in any convenient location within a ship 11, for example, in the helm or bridge in front of the wheel. The U-shaped bracket 12 adjustably mounts the head 10 which displays the two digits 13 and 14 so that the actual depth of water directly below the ship can be easily read at a glance. While only two digits are shown and described, it is within the scope of the invention to use any desired number thereof, as will become apparent. A switch 15 is provided on the side of the head 10 for easy accessibility to shift the system between foot and fathom reading, as desired.

As seen in the block diagram of FIG. 2, the sonar system generally includes a simple neon tube pulse generator 20 which determines the sounding rate of the system. When the system is operating, the pulse generator 20 produces a signal which triggers the monostable multivibrator circuit 22 having the three outputs 23, 24 and 25. The first of these outputs 23 is connected to the display system and resets the same to a preset reading, e.g., zero, whereas the second and third outputs 24 and 25 are negative pulses which are delayed a short period from the first signal to trigger simultaneously the stop-start flip-flop or gate circuit 27 to its non-conducting condition and the transmitter driver monostable multivibrator 28.

The first of the two outputs 30 and 31 from the transmitter driver 28 is delayed slightly from the reset pulse 23 to disable the receiver system for the duration of the transmitting cycle by the connections to the receiver amplifier 33 and thyratron 34. The other output 31 is positive and is fed to the transmitter trigger 35 which assumes its conducting state wherein it discharges the capacitor 36 through the transformer 38. The voltage from the capacitor 36 is sufficient to cause the transformer 38 to ring at a predetermined design frequency and thus generate a high-voltage pulse to the transducer 40 which in turn sends a sound wave toward the bottom of the body of water.

Once the start-stop gate 27 is shifted to its non-conducting state by the multivibrator 22, a cutoff bias in conductor 41 to the time base pulse or clock generator 42 is removed and a series of timed pulses is produced by the generator 42. These pulses are subsequently inverted by the pulse inverter 44 connected to a ring counter driver 46 which produces two output signals of a predetermined width slightly overlapping for driving the ring counter circuit 48. Each pulse transfers the ten-position ring or decade counter 48 one position and each of the ten stages conducts in sequence as this tube is transferred through its available ten positions.

When any of these ring counter stages conducts, the signal is fed to the readout tube drivers 50 to cause the associated display tube cathode 52 to be ionized and caused to glow. These cathodes are shaped in the form of numbers and are readily visible so the output is read in precise digital form. Each time the ring counter 48 passes through ten units it supplies a single pulse to the tens counting system which includes the ring counter driver 47, the ring counter 49, the display tube driver 51, and the display tube 53. Due to the connections 54 between the gate 27 and the display tubes 52 and 53 through the control tube 183, both display tubes are inactive during the non-conducting condition of the gate 27 so that scrambling of the readout is eliminated until the gate assumes its Off condition. Because of the short time required by each cycle, the display tubes present an apparent continuous display to the human eye.

After a pulse has been reflected from the bottom of the body of water, it is received in the transducer 40 and conducted to the receiver through the transformer 38. The receiver consists of three high-gain amplifier stages 55, 56, and 33, which are followed by the bridge rectifier 60. The rectifier and amplifier stage 58 establish cut-off bias to trigger the thyratron 34 whose negative plate signal is applied to the start-stop gate 27 causing the same to assume its conducting state. This action biases the pulse generator 42 to its Off condition and this stops the generation of pulses thereby. The counting operation then stops and the display tubes 52 and 53 indicate in digits the depth of the body of water. During the conducting condition of the gate 27 a signal is also supplied through the conductor 61 to the amplifier 58 to clamp this amplifier and thereby prohibit the flow of transient pulses which might otherwise follow the primary signal or pulse.

Referring now primarily to FIGS. 3–8 wherein a typical embodiment of the electrical circuitry is shown, FIG. 3 illustrates the signal generator 20 including the neon tube relaxation oscillator V1 connected to ground 64 through the LC circuit 65 and to a suitable power supply (not shown) through the conductor 67. Throughout the drawings, the various connections to the power supply are designated on the drawings B— for a negative voltage and B+ for a positive voltage. The output of the oscillator V1 is supplied by the conductor 68 to the monostable multivibrator 22 including the triple triode V2 whose cathodes 70 are connected to the power supply through the conductors 71. Thus the negative signal (FIG. 9, No. 1) from the oscillator V1 is imposed on the grid 72 of the first triode 74 causing the current flow therethrough to produce a pulse at the plate 75. This pulse is supplied through the conductor 76 and condenser 77 to the grid 78 of the second triode 80 causing current flow therethrough so that the positive pulse is produced at the plate 82 and in the reset conductor 23 (FIG. 9, No. 2) which actuates the reset amplifier 83 to reset the display system, as will be described in detail hereinafter.

The signal from the first triode 74 is also imposed on the grid 84 of the third triode 86 through the conductor 87 thereby generating a slightly delayed negative pulse at the plate 88 and conductor 24 (FIG. 9, No. 3) which is connected to the start-stop gate 27, and to the transmitter driver multivibrator 28 (FIG. 9, No. 4) including the triple triode V3 through the conductor 25. The protective diode 93 in the conductor 25 permits current flow in one direction only, so that the negative signal from triode 86 passes readily therethrough to the start-stop gate 27. The diode 94 in conductor 25 also is a protective measure to restrict the flow of current therethrough. The negative pulses pass readily through the conductors 25 and 95 to the grid 96 of the first triode 97 causing momentary cessation of current flow therein. The output of the plate 98 of this triode together with the signal in conductor 99 is supplied to the grid 100 of the second triode 101. An output in the form of a negative square pulse of substantial time duration (FIG. 9, No. 5) is generated at the plate 102 and the blanking conductor 30 for disabling the receiver amplifier 33 and thyratron 34 during the generation cycle.

The signal in the conductor 25 is also supplied to the grid 106 of the third triode 107 through the conductor 108 to cause conduction and produce a positive square pulse in the plate 110. This square wave (FIG. 9, No. 6) is supplied through the conductor 31 to the grid 113 of the transmitter 35 including the thyratron tube V4 causing it to conduct and produce a pulse at its plate 115 and in the conductor 116. This pulse (FIG. 9, No. 7) triggers discharge of the capacitor 36 through the transformer 38 causing it to resonate and produce a high voltage signal to the transducer 40 which in turn generates a sound wave in the body of water.

Referring now to FIG. 5, the start-stop gate 27 is a bi-stable multivibrator V6 which receives a signal (FIG. 9, No. 8) from the multivibrator 22 through conductor 24 and a stop signal (FIG. 9, No. 10) through the conductor 120 from the thyratron 34 of the receiver. Thus the signal in the form of a negative pulse is imposed on the grid 121 of the dual triode V6 to terminate conduction therein so that the plate 123 no longer supplies a continuous bias (FIG. 9, No. 9) through the conductor 41 to the time base clock 42. This situation continues until such time as the stop signal (FIG. 9, No. 10) is supplied to the other grid 125 of the triode V6 through the conductor 120.

The relief of the bias on the grid 128 of the dual triode V5 of the time base clock or pulse generator 42 causes this free running multivibrator to produce a series of precisely timed negative pulses (FIG. 9, No. 12). The grids 128 and 131 of the dual triode V5 are interconnected through the conductors 133 and 134 and capacitors 135 and 136 to the plates 137 and 138, and the result is a series of negative pulses produced in the conductor 140. The frequency of these pulses can be changed by closing the switch 141 to cause the relay 142 to close and add the capacitor 143 in parallel with the capacitor 135 and to thus reduce the frequency of the output pulses in conductor 140 so that the system will now read in fathoms rather than feet. The variable resistance 145 in the pulse generator permits calibration thereof so that the precise pulse frequencies desired are produced.

The negative pulses from the pulse generator are fed through conductor 140 to the grid 146 of the pulse invertor 44 which consists of one-half of a dual triode V7 with suitable associated circuitry for inverting the pulses so that a positive pulse of the same frequency is produced at the plate 148 and the output conductor 150. This positive signal is thus fed to the grid 151 (FIG. 6) of the first triode 152 of the units ring counter driver 46. The driver counter 46 is a triple stage monostable multivibrator V8 which generates two precisely timed slightly overlapping negative output pulses (FIG. 9, Nos. 14 and 15) in the plates 154 and 155 of the triodes 152 and 156 which are connected to the ring counter 48 by the conductors 157 and 158, respectively. This overlapping signal is the characteristic signal used in the ring counter tubes V9 and V21, for example, Model No. CT4251 of Sylvania Electric Products, Inc., of Williamsport, Pennsylvania, U.S.A.

In response to these input pulses the ring counter tube V9 sequentially produces signals in the output conductors 161–170 so that the pulses are transferred to the triodes 161a–170a (FIG. 7) associated with the conductors 161–170, respectively. When a pulse is applied to the grid of any of the display tube drivers 161a–170a, an output signal is furnished to the associated cathodes 161b–170b, of the display tube V15 causing a corresponding reduction in the cathode potential. This action causes the appropriate display cathode in the form of a number to ionize and glow thereby producing a readily visible readout signal in digital form. The display tubes are standard tubes such as those manufactured by the Burroughs Corporation of Plainfield, New Jersey, U.S.A., and sold as Model No. 6844A.

The tens counting system (FIGS. 7 and 8) is substantially identical to the units counting system described above. In other words, the ring counter driver tube V20, the ring counter or beam switching tube V21, the display tube drivers 51 and the display tube V27 are substantially identical to the corresponding units of the units counter. Consequently, the various components are designated by identical reference characters, and only the features which differ from the units counter are described in detail.

When a signal (FIG. 9, No. 17) is generated in the 0-output conductor 170 of the units ring counter tube V9, a signal is also supplied to the tens counting system through the conductor 173 (FIG. 6) and the blocking tube 175 which permits only a positive pulse to pass therethrough and be amplified. The output from this tube is supplied to the ring counter driver tube V20 of the tens counting system through the conductor 176 which in turn supplies the overlapped signals (FIG. 9, Nos. 14 and 15) to the ring counter tube V21.

Each of the display tubes V15 and V27 is clamped to ground through the conductor 182 and the control tube 183 so that scramble is eliminated during the period between cycles. Thus when a signal is generated in the output conductor of the start-stop gate 27, it is applied through conductor 186 to the grids 187 of the triode 183 to ground clamp the display tubes V15 and V27 and prevent ionization of any of the cathodes. In practice, the time between cycles is so short that the display tube appears to present a continuous display.

During operation of the system, the units and tens counting systems count accurately and display the number of pulses produced by the time base clock between the time a signal is generated and a return signal is received. As shown in FIG. 9 (line No. 16), the No. 9 conductor 169 receives in sequence a pulse which is counted and subsequently the No. 0 conductor 170 receives the next pulse (line No. 17) which is similarly counted. When a return echo signal is picked up by the transducer 40 and the gate 27 goes nonconducting, the control tube 183 no longer clamps the display tubes V15 and V27 to ground so that they display the depth of the water below the vessel. For example, if this distance were nine feet, a continuous pulse is produced by the ring counter 48, and this pulse is shown in line 16 of FIG. 9 as "Read 9 output."

Each time a cycle starting pulse is generated and energizes the transmitter driver 28, a reset pulse is generated in the line 23 (see FIG. 3) which is connected to the grid 188 of the reset amplifier 83, as shown in FIG. 5. The reset pulse resets the display tubes 52 and 53 to a preset starting point, e.g., 00, as will be seen. The plate 189 of this triode 83 produces a negative pulse which passes through the line 174 into the conductors 190 and 191 which have the diodes 193 thereon to isolate the units and tens counting systems. The conductors 190 and 191 are connected to the ten position manually actuated switches 194 and 195 which are interconnected so that they can be moved together. The contacts 0–9 of the switch 194 are connected to the output conductors 161–170 of the ring counter 48 through the lines 201–210, respectively, and the selector 212 of this switch is connected to the reset amplifier 83 through the conductor 190. The switch 195 has the numbers 1–9 contacts interconnected with the output conductor 214 whereas the 0 contact is connected to the conductor 215. The selector 216 of this switch is connected to the reset amplifier 83 through the conductor 191 so that the reset pulse is supplied to conductor 214 when in positions 1–9 and to the conductor 215 when the selector 216 engages the 0 contact.

The conductors 214 and 215 then supply the reset signals to the tens ring counter 49 (FIG. 8) which also has a pair of manually actuated ten position switches 217 and 218 associated therewith. The first of these switches 217 has its ten contacts 0–9 connected by the conductors 221–230 to the output lines 161–170 of the ring counter 49 in such a manner that each of the contacts 0–9 is connected to an output line numbered one less than the contact, e.g., the 6 contact is connected to the output line 165 for the number 5. The selector 231 of this switch receives pulses from the switch 195 through the line 215. The second switch 217 has its ten contacts 0–9 also connected by the lines 241–250 to the output conductors of the ring counter 49. The importance of this will become apparent in connection with the operation thereof. The selector 252 of this switch receives the reset pulses from the switch 194 through the conductor 214.

The reset system has the capability of compensating for differences in distance between a known vertical level and the transducer, e.g., between the screw of the ship and the transducer 40. For example, by appropriately adjusting the system, the depth of water which is read from the display tubes 52 and 53 is the distance below the screw and not that below the transducer 40. The switches 194, 195, 217 and 218 can be set manually to appropriately set for any desired compensation. If the correction is to be minus 15, the setting will be 85 so that interconnected selectors 212 and 216 of the units counter are set on 5. Thus each time a reset signal occurs in the conductor 190 it passes through the switch 194 to the output line 165 of the ring counter tube V9 causing the ring counter to conduct through its No. 5 position.

At the same time, the selectors 231 and 252 of the tens counting system are set in the No. 8 position. The reset pulse then passes through the line 191, the switch 195 and into the conductor 214. It continues to pass through the switch 218, the No. 8 contact, and into the conductors 248 and 168 of the tens ring counter 47 causing the ring counter to conduct through its No. 8 position. If the correction is to be plus 15, for example, this value is set directly on the switches 194, 195, 217 and 218 so that an additional fifteen feet or fathoms are added to the counting system.

The operation of this reset mechanism is somewhat different when the units correction factor is a zero since a reset signal in the conductor 170 of the units ring counter 48 supplies a signal to the tens counting system through the conductor 173. Thus when the switches 194 and 195 have their selectors 212 and 216 set on zero the reset pulses from the line 191 pass into line 215 to the switch 217. The contacts of this switch are so arranged that the signal is applied to the output conductor of the ring counter 49 corresponding to a number which is one less than that set on the switch 217. Thus if the selector 231 is set on contact 7 the signal is applied to the line 226 to the conductor 166 to cause the ring counter 49 to conduct through the No. 6 stage. However, since a signal occurs in the zero output conductor 170 of the units counter 48 thereby causing a signal to be supplied through the conductor 173 to the tens counting system, the ring counter 49 is advanced an additional position and the ultimate result is a display of 7 in the tens display tube 53. Accordingly, any amount between minus 99 and plus 99 can be set into the reset system to compensate for differences in vertical elevation between the transducer and a reference point from which it is desired to measure the depth of the water.

Referring now to the receiver shown in FIG. 4, when a signal is received from the transducer 40, it is supplied to grid 260 of the tube V28 of the first receiver amplifier stage 55 through the output transformer 38, the conductor 261, and the diode 262 which isolates the receiver from the large positive excursions of the transmitted signal. The amplified signal from the plate 263 of tube V28 is then supplied to the grid 265 of the second stage 56, and the amplified signal from the plate 266 of this stage is supplied to the grid 267 to the third stage pentode 33 whose output is coupled through the transformer 268 to the bridge rectifier 60.

A gain control 269 is provided between the amplification stages 55 and 56 and includes a variable resistance 270 which can be changed to appropriately affect the gain of the signal supplied to the grid 265. By reducing the gain when operating in shallow water the tendency to overload the receiver is reduced. The resistance 270 is varied by the rotatable knob 271 on the readout head 10, as seen in FIG. 1. The tube V29 of the amplification stage 58, as well as the thyratron tube V31, are supplied with a blanking signal from the transmitter driver 28 through the conductor 30 and the blocking diode 273 so that, during the generation of the output signal, these stages are desensitized.

The output from the transformer 268 is conducted through a bridge rectifier 60 to insure that only negative signals (FIG. 9, No. 18) are supplied therethrough to the input grid 276 of the thyratron driver tube V30 to produce a cut-off bias and an amplified positive pulse in the output conductor 278 thereof. The positive output driver 58 triggers the thyratron tube V31 whose negative plate signal (FIG. 9, No. 10) is applied through line 120 to the conducting side of triode 126 (FIG. 5) of the start-stop gate 27 to effect operation of this bistable unit which biases the pulse generator 42 off. Simultaneously, the driver 58 is clamped against further operation by a signal from the gate 27 which is produced in conductor 280 by current flow in the tube 126 (FIG. 5) as a result of the pulse from the thyratron 34. This action results in the elimination of undesirable secondary or transient signals in the receiver. The driver 58 thus constitutes a driver clamping circuit which allows only one firing of the thyratron 34 per sounding cycle since its grid signal is derived from the gate 27. Discharge of the load capacitor 272 of the thyratron 34 through the parallel resistor 273a resets the thyratron 34 for its next operation cycle.

The firing of the thyratron 34 immediately terminates operation of the time-base pulse generator 42 so that the flow of pulses to the counting system is terminated. In its conducting condition, the gate 27 no longer clamps the display tubes 52 and 53 to ground so that depth is displayed thereon.

In summary, the operation of the sonar system commences when a signal is generated in the neon tube V1 and the pulse is suitably shaped by the multivibrators V2 and V3 to trigger the thyratron tube V4 which discharges the capacitor 36 through the transformer 38 to generate a sound wave from the transducer 40. At this time the ring counters 48 and 49 are reset to a starting position; and the gate 27 is triggered to its nonconducting state. The pulse generator 42 then produces a series of precisely timed pulses which are inverted and supplied to the drivers 46 and 47 and then to the units and tens counting systems so that the number of pulses is counted and displayed in the readout tubes 52 and 53 which have cathodes shaped in the form of numbers.

The pulses produced by the pulse generator 42 are precisely timed and calibrated with the passage of the wave through the water so that the reflected signal indicates the depth of the water, e.g., one pulse equals one foot. During pulse generation, the receiver is desensitized by blanking pulses from the multivibrator V3 which is supplied to the amplifier 33 and the thyratron 34. In addition, the gate 27 supplies a signal to the control grid 187 which clamps each of the display tubes 52 and 53 (V15 and V27) to ground so that scrambling is eliminated, and a visible readout occurs only when the counting operation is terminated. In effect, since the system cycles at a high rate, the readout appears as a constant reading.

When a return signal is picked up by the transducer it is amplified and shaped through the receiver stages 55, 56, and 33 to trigger the thyratron 34 which in return supplies the conducting signal to the gate 27. At this point the production of signals by the pulse generator 42 is terminated, and the readout is visible since the control 183 no longer clamps the readout tubes 52 and 53 to ground. The gate 27 also supplies a signal to the amplifier stage 58 to eliminate transient signals which may be produced therein.

FIG. 10 illustrates another embodiment of the invention wherein a plurality of readout heads 10a, 10b, and 10c are mounted in different locations on the vessel. Each of these heads 10a comprises a units display tube 52 and a tens display tube 53 which are identical to those described above. Moreover, each of these tubes receives its input signals and its blanking signals in the same manner as those described above and, accordingly, only the portions of FIG. 2 which are different have been illustrated in FIG. 10. Thus the units ring counter 48 receives a signal from the driver 46 and this signal is supplied through a a driver 50 to each of the units display tubes 52 through the conductor 300.

The ring counter 48 supplies an appropriate signal to the driver 47 and the tens ring counter 49 which in turn supplies a signal to the driver 51 to drive each of the tens display tubes 53 through the conductor 301. Thus each of the readout heads 10a–10c display identical readings at all times, and each is clamped to ground by the control tube 183 which receives its grid signal from the gate 27 to connect each of these tubes to ground through the conductor 303 in substantially the same manner as described above. Both the ring counter tubes 48 and 49 are also reset in the same manner as described above.

FIG. 11 illustrates a further modification of the invention which includes an automatic printer 310 in addition to the display tubes 52 and 53 described above. The driver 46 and ring counter 48 thus provide units pulses through the conductor 311 to the automatic printer 310 to program the same to print the units. A tens pulse is provided through the conductor 173 to the driver 47 and ring counter 49 which in turn supply a tens pulse to the printer 310 through the conductor 313. Each time the gate 27 is switched to its conducting position when a return echo is received, a signal is supplied through the conductor 315 to the printer 310 causing the printing operation to occur so that the units and tens figures which occur at that moment are automatically printed on a paper tape or the like to provide a record of the depth. Simultaneously with the generation of the next transmitted sound wave, the ring counters 48 and 49 are reset through the amplifier 83 in the manner described above, and the automatic printer 310 is similarly reset to a starting position by a signal from the reset amplifier 83 through the conductor 316. In substantially all other respects, this system is identical to that described above and shown in FIG. 2. A typical printer 310 which may be used in this system is sold as Model No. 80 by Durant Manufacturing Company of Milwaukee, Wisconsin, U.S.A.

The invention has thus provided a simplified sonar system which is completely electronic and which provides an instantaneous digital display which can be read from a distance without the requirement of interpolation. The readout head 10 can be mounted at a remote point from the transmitter and receiver, and additional digits can be supplied thereto so that any number of places can be read, for example, 100 or 1000. It is also possible to modify the system so that it reads to one or more decimal places without departing from the scope of the invention. Moreover, the readout can be either in feet or fathoms as determined by movement of a simple switch on the readout head.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A sonar system of the character described adapted for installation in a ship or the like for measuring the depth of a body of water below the ship or the like comprising, pulse generating means including a transducer adapted to be mounted on the bottom of the ship for generating a sound wave for passage from a transmitter to the bottom of the body of water to be reflected therefrom, a gate which is energized to a first non-conducting state simultaneously with the generation of said sound wave, a time base pulse generator connected to said gate for generating a series of pulses of predetermined length when said gate is in said first state, said pulses being correlated with the speed with which said sound wave passes through the water, first and second ring counter tubes each having ten outputs so that pulses supplied thereto sequentially advance said ring counters and current flow is sequentially produced in said outputs, first and second display tubes each having ten cathodes shaped in the form of numbers 0—9, said cathodes of said first and second display tubes being connected to one of said outputs of said first and second ring counter tubes, respectively, said cathodes adapted to glow when current flows therethrough thus presenting a visual display, said first ring counter tube being connected to said pulse generator and said second ring counter tube being connected to the number zero output of said first ring counter so that said cathodes display in units and tens the pulses from said generator, receiver means for receiving and amplifying the wave reflected from the bottom of the body of water and being connected to said gate to change said gate to a second state when a signal is received thereby terminating operation of said time base pulse generator so that the depth of water can be easily read on said cathodes of said digital display tubes, means connected to said gate for causing said display tubes to be inoperative when said gate is in said first state to eliminate scrambling of said cathodes, and means connecting said pulse generating means and said ring counter tubes for resetting said ring counter tube each time a sound wave is generated.

2. A sonar system as defined in claim 1 wherein means are associated with said ring counter tubes to compensate for the difference in vertical distance between said transducer and another known point.

3. A sonar system as defined in claim 2 wherein said known point is the lowest point of the ship.

4. A sonar system as defined in claim 1 wherein manually adjustable reset mechanism is connected to said first and second ring counter tubes for resetting said ring counter tubes each time a sound wave is generated.

5. A sonar system as defined in claim 1 wherein said display tubes have their anode potential reduced only when said gate is non-conducting so that scrambling is prevented.

6. A sonar system as defined in claim 1 wherein said ring counter tubes are reset to zero each time said sound wave is generated.

7. A sonar system as defined in claim 1 wherein a head is provided to enclose said display tubes for mounting adjacent one another at a point remote from said pulse generating means and said receiver means for convenient viewing.

8. A sonar system as defined in claim 1 wherein means are provided to desensitize said receiver means during production of said sound wave, and said receiver means is connected directly to said transducer which transmits and receives sound waves.

9. A sonar system as defined in claim 1 wherein means are provided to connect said gate to said receiver means to block the flow of transient pulses in said receiver means when said gate is in said second state.

References Cited by the Examiner

UNITED STATES PATENTS

| 2,433,385 | 12/1947 | Miller | 340—3 |
| 2,753,542 | 7/1956 | Rod et al. | 340—3 |
| 2,949,973 | 8/1960 | Broding et al. | 181—0.5 |
| 3,141,960 | 7/1964 | Biser | 235—92 |
| 3,158,854 | 11/1964 | Keen et al. | 324—68 X |
| 3,195,103 | 7/1965 | Drenkelfort | 340—3 |

FOREIGN PATENTS

| 790,934 | 2/1958 | Great Britain. |

CHESTER L. JUSTUS, *Primary Examiner.*
RODNEY D. BENNETT, *Examiner.*
R. A. FARLEY, *Assistant Examiner.*